US009713108B2

(12) United States Patent
Charbit et al.

(10) Patent No.: US 9,713,108 B2
(45) Date of Patent: Jul. 18, 2017

(54) SYNCHRONIZATION FOR LOW COVERAGE MACHINE TYPE COMMUNICATION DEVICES

(71) Applicant: MEDIATEK Singapore Pte. Ltd., Singapore (SG)

(72) Inventors: Gilles Charbit, Hampshire (GB); Feifei Sun, Beijing (CN)

(73) Assignee: MEDIATEK Singapore Pte. Ltd., Singapore (SG)

( * ) Notice: Subject to any disclaimer, the term of this patent is extended or adjusted under 35 U.S.C. 154(b) by 258 days.

(21) Appl. No.: 14/511,410

(22) Filed: Oct. 10, 2014

(65) Prior Publication Data

US 2016/0105862 A1 Apr. 14, 2016

(51) Int. Cl.
*H04L 12/28* (2006.01)
*H04W 56/00* (2009.01)
*H04L 7/027* (2006.01)
*H04W 4/00* (2009.01)

(52) U.S. Cl.
CPC ......... *H04W 56/0015* (2013.01); *H04L 7/027* (2013.01); *H04W 4/005* (2013.01)

(58) Field of Classification Search
CPC combination set(s) only.
See application file for complete search history.

(56) References Cited

U.S. PATENT DOCUMENTS

| 6,567,376 B1* | 5/2003 | Karlsson | G06F 11/2038 370/216 |
| 2014/0071957 A1* | 3/2014 | Xu | H04W 52/0219 370/336 |
| 2014/0198772 A1 | 7/2014 | Baldemair et al. | 370/335 |
| 2014/0293853 A1 | 10/2014 | Cho et al. | 370/311 |

FOREIGN PATENT DOCUMENTS

CN 102761957 A 7/2012

OTHER PUBLICATIONS

International Search Report and Written Opinion of International Search Authority for PCT/CN2014/092320 dated Jun. 29, 2015 (10 pages).

* cited by examiner

*Primary Examiner* — Kevin C Harper
*Assistant Examiner* — Mon Cheri Davenport
(74) *Attorney, Agent, or Firm* — Imperium Patent Works; Zheng Jin; Darien Wallace

(57) ABSTRACT

A method of fast synchronization for low coverage machine type communication (MTC) devices is proposed. A machine-specific synchronization signal "mSYNC" with higher density in time and frequency is transmitted from each base station for fast timing and frequency acquisition and tracking. The mSYNC has a relatively longer periodicity (i.e., >>5 ms) to reduce overhead and inter-cell interference. The higher time-frequency density of mSYNC is designed to improve latency and power consumption by allowing the machine to wake up just before the scheduled mSYNC transmission time and to re-synchronize or track synchronization with the network without the need for long averaging time.

26 Claims, 5 Drawing Sheets

SYNCHRONIZATION FOR LOW COVERAGE MACHINE TYPE COMMUNICATION DEVICES

TECHNICAL FIELD

The disclosed embodiments relate generally to synchronization, and, more particularly, to synchronization for low coverage machine type communication (MTC) devices in LTE networks.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

The initial access by a UE to a cell served by an eNB involves a number of steps. In step 1, the UE first acquires LTE rel-8 PSS/SSS (primary synchronization signal and/or secondary synchronization signal) to synchronize to the cell within an acceptable range of residual Carrier Frequency Offset (CFO) and residual timing offset. The UE also acquires cell ID of the cell. In step 2, to ensure there is no erroneous synchronization, the UE detects the Master Information Block (MIB) on PBCCH (Physical Broadcast Control Channel). If CRC is valid, the UE acquires basic system information such as System Frame Number (SFN) broadcasted in the MIB for frame timing and fine tune synchronization parameters using LTE rel-8 Cell Specific Reference Signals (CRS).

The initial access can take up to 600 ms at very low signal to noise ratio (SNR). To achieve an overall coverage enhancement target of 20 dB, even longer access times are needed, e.g., two seconds for FDD system and possibly longer for TDD system. For MTC (machine type communication) devices, after initial access to a cell, a machine may go to sleep for a very long time (i.e., several minutes) to conserve energy. The machine may lose synchronization with the cell completely after waking up. Because rel-8 CRS are typically used with post-FFT detector for fine synchronization or synchronization tracking with reasonable residual CFO (to limit inter-carrier interference) and residual timing offset (FFT window timing), using rel-8 CRS to re-synchronize with the cell may not be possible. As a result, the machine may need to use PSS/SSS to re-synchronize with the cell, which adds to latency and power consumption.

A machine-specific pilot "mSYNC" with higher density in time and frequency domain transmitted with a relatively longer periodicity (i.e., >>5 ms) for fast timing and frequency acquisition and tracking could help improve latency and power consumption for machine re-synchronizing or tracking synchronization. A solution is desired to allow machine to wake up just before the mSYNC is scheduled by eNB to avoid excessive power consumption. The higher time-frequency density of mSYNC is designed to allow machine to re-synchronize or track synchronization with the network without the need for long averaging time, which improves latency.

SUMMARY

A method of fast synchronization for low coverage machine type communication (MTC) devices is proposed. A machine-specific synchronization signal "mSYNC" with higher density in time and frequency is transmitted from each base station for fast timing and frequency acquisition and tracking. The mSYNC has a relatively longer periodicity (i.e., >>5 ms) to reduce overhead and inter-cell interference. The higher time-frequency density of mSYNC is designed to improve latency and power consumption by allowing the machine to wake up just before the scheduled mSYNC transmission time and to re-synchronize or track synchronization with the network without the need for long averaging time.

In one embodiment, a UE obtains a cell ID and a system frame number (SFN) of a cell in a mobile communication network. The UE may obtain the cell ID and SFN by performing initial access using PSS/SSS and reading MIB broadcasted by the cell. The UE may also obtain the cell ID and SFN by (blind) detecting an mSYNC transmitted from the cell. The UE remembers the cell ID and keeps counting the SFN based on UE clock timing. Next, the UE determines an mSYNC timing of the cell based on the SFN. The UE then performs synchronization with the cell by detecting the mSYNC. In one example, the UE enters power saving mode (PSM) and loses synchronization with the cell after obtaining the cell ID and the SFN of the cell. The UE then wakes up before the mSYNC timing with a clock-drift offset and performs synchronization by detecting the mSYNC with known mSYNC timing.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
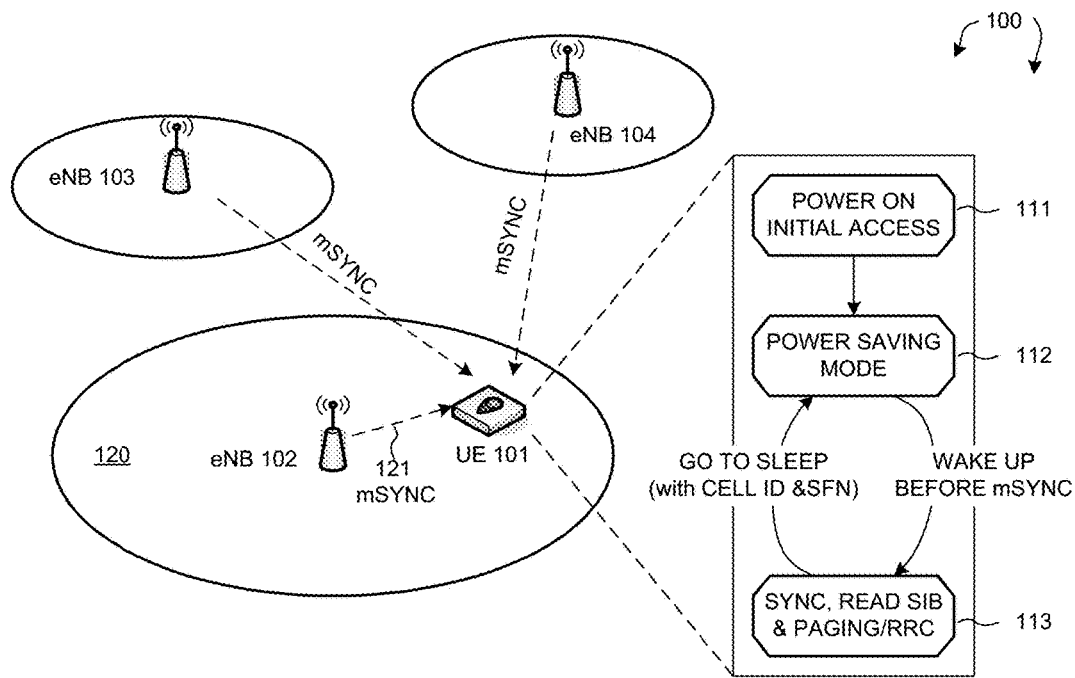
FIG. 1 illustrates an MTC device and its synchronization in an LTE mobile communication network in accordance with one novel aspect.

FIG. 1 illustrates a machine type communication (MTC) device and its synchronization in an LTE mobile communication network 100 in accordance with one novel aspect. Mobile communication network 100 is an OFDM/OFDMA LTE system comprising a user equipment UE 101, and a plurality of base stations eNB 102, eNB 103, and eNB 104 that serve a plurality of cells. The initial access by UE 101 to a cell served by an eNB involves a number of steps that can take up to 600 ms at very low signal to noise ratio (SNR). A first step of initial access involves acquiring PSS/SSS (Primary and Secondary Synchronization Signal) to synchronize to a cell within an acceptable range of residual CFO (Carrier Frequency Offset) and residual timing offset and acquiring cell ID. A second step of initial access involves obtaining SFN (System Frame Number) of the cell from reading the MIB (Master Information Block) and fine-tuning synchronization parameters using CRS (Cell-Specific Reference Signal). To achieve an overall coverage enhancement target of 20 dB, even longer access times are needed, e.g., two seconds for FDD (Frequency Division Duplex) system and possibly longer for TDD (Time Division Duplex) system.

In the example of FIG. 1, UE 101 is an MTC device, which may go to sleep for a very long time (i.e., several minutes) to conserve energy. The machine may lose synchronization with the cell completely after waking up. Because CRS are typically used with post-FFT detector for fine synchronization or synchronization tracking with reasonable residual CFO (to limit inter-carrier interference) and residual timing offset (FFT window timing), using CRS to re-synchronize with the cell may not be possible. As a result, the machine may need to use PSS/SSS to re-synchronize with the cell, which adds to latency and power consumption.

In accordance with one novel aspect, a machine-specific synchronization signal "mSYNC" with higher density in time and frequency is transmitted from each base station. The mSYNC has a relatively longer periodicity (i.e., >>5 ms) to reduce overhead and inter-cell interference. On the other hand, the higher time-frequency density of mSYNC is designed to improve latency and power consumption by allowing the machine to wake up just before the scheduled mSYNC transmission time and to re-synchronize or track synchronization with the network without the need for long averaging time. The machine-specific synchronization signal "mSYNC" would hence allow faster re-sync than would be possible with a signal like primary and secondary synchronization signals (PSS/SSS) which has lower overhead but shorter periodicity of 5 ms.

In the example of FIG. 1, UE 101 performs initial access upon power on (step 111). The initial access involves time and frequency synchronization and cell detection with a preferred cell. For example, UE 101 synchronizes with cell 120 served by eNB 102. After the initial access, the UE may camp on the cell and listen to paging or establish a Radio Resource Control (RRC) connection with the cell for uplink (UL) transmission. Later on, in step 112, UE 101 goes to power saving mode (e.g., goes to sleep) for power saving. Because UE 101 is a MTC device, the machine can go to sleep for a very long time (i.e., several minutes or longer) to conserve energy. However, the machine remembers the cell ID of the previously camped or served cell 120, and keeps counting the System Frame Number (SFN) of the previously camped or served cell 120. In step 113, UE 101 wakes up and needs to synchronize with the network again. For low mobility machine type device, UE 101 is likely to wake up in the same cell 120 served by eNB 102.

In the embodiment of FIG. 1, eNB 102 periodically transmits a machine-specific synchronization signal mSYNC 121 with higher density in time and frequency to facilitate synchronization for MTC devices. The timing of mSYNC 121 is linked to the SFN of cell 120, and such relationship is known to UE 101 via predefinition or via network configuration. Because UE 101 keeps counting the SFN of cell 120 during power saving mode, UE 101 is able to determine the timing of mSYNC 121. As a result, UE 101 wakes up right before mSYNC 121 is scheduled for transmission and re-synchronizes with cell 120 without long averaging time, which improves latency. After re-synchronization, UE 101 may again camp on the cell and listen to paging or establish an RRC connection with the cell for uplink (UL) transmission. Later on, UE 101 may go to sleep again for power saving and go back to step 112, and the same operation repeats.

Figure 2:
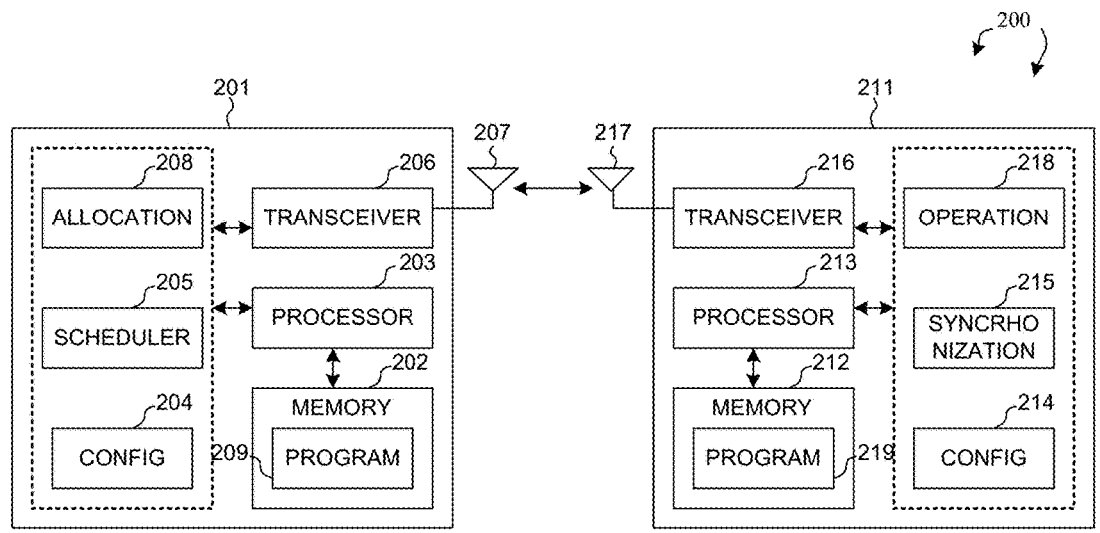
FIG. 2 illustrates simplified block diagrams of a base station and a user equipment in accordance with embodiments of the present invention.

FIG. 2 illustrates simplified block diagrams of a base station eNB 201 and a user equipment UE 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 353 processes the received baseband signals and invokes different functional modules to perform features in base station 201. Memory 202 stores program code instructions and data 209 to control the operations of the base station. Similar configuration exists in UE 201 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 363 processes the received baseband signals and invokes different functional modules to perform features in UE 211. Memory 212 stores program code instructions and data 219 to control the operations of the UE.

Base station 201 and UE 211 also include several functional modules to carry out some embodiments of the present invention. The different functional modules can be implemented by software, firmware, hardware, or any combination thereof. The function modules, when executed by the processors 203 and 213 (e.g., via executing program codes 209 and 219 in memory 202 and 212), for example, allow base station 201 to configure and transmit mSYNC to UE 211, and allow UE 211 to receive mSYNC and performs synchronization and other operation accordingly. In one example, base station 201 allocates a set of radio resource for mSYNC transmission via allocation module 208 and schedules data transmission via scheduler 205. The base station transmits control and configuration information to the UE via configuration module 204. UE 211 receives control and configuration information via configuration module 214. UE 211 performs synchronization via synchronization module 215 and performs other operation via operation module 218.

Figure 3:
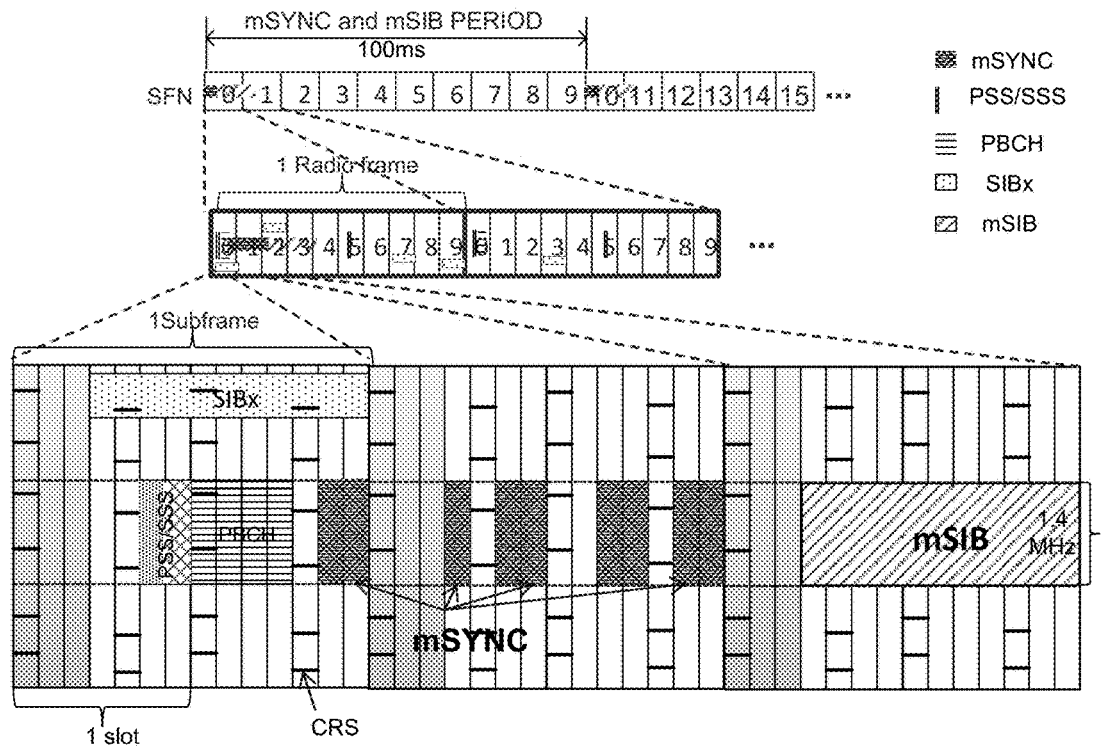
FIG. 3 illustrates one embodiment of a machine specific synchronization signal mSYNC.

FIG. 3 illustrates one embodiment of a machine specific synchronization signal mSYNC. In LTE systems, UE and eNB communicate with each other by sending and receiving data carried in radio signals according to a predefined radio frame format. Typically, the radio frame format contains a sequence of radio frames, each having the same frame length and consisting 10 subframes. Each subframe has a time length of 1 ms and is comprised of two slots and each slot has seven OFDMA symbols in the case of normal Cyclic Prefix (CP) and six OFDMA symbols in case of extended CP. Each OFDMA symbol further consists of a number of OFDMA subcarriers depending on the system bandwidth. The radio frames are numbered sequentially with a System Frame Number (SFN).

As illustrated in FIG. 3, the primary and secondary synchronization signals (PSS/SSS) are allocated in the first and sixth subframes of each radio frame with 5 ms periodicity for time and frequency synchronization and cell ID acquisition. The Master Information Block (MIB) is carried in Physical Broadcast Channel (PBCCH), which is transmitted every radio frame with 10 ms periodicity and 4 repetitions. UE detects MIB on PBCCH to ensure there is no erroneous synchronization. PBCCH relies on CRS for demodulation at UE side and UE can determine the number of transmit antenna ports through the blind decoding on CRS and further confirmation with MIB content. If CRC is valid, UE acquires basic system information such as SFN carried in MIB. The UE is able to obtain other system information contained in SIB1 and other SIBs (e.g., SIBx). SIB1 is transmitted every second radio frame with a fixed periodicity of eight radio frames while other SIBs has variable periodicity configured in SIB1. In addition to SIBx, a new system information block "mSIB" may be defined as a "Lean" system information block that is dedicated to narrowband MTC devices.

To minimize the introduced overhead and inter-cell interference, the transmission periodicity of mSYNC signals can be increased, e.g. 50 ms or 100 ms. For example, if the mSYNC periodicity=100 ms, then mSYNC is transmitted in every tenth radio frame (e.g., SFN=0, 10 . . . and so on so forth). To enable fast timing and frequency acquisition and tracking, mSYNC with denser pilots are designed. For example, mSYNC occupies 1.4 MHz in frequency domain and at least one to five subframes in time domain for each mSYNC occasion. This is because 1) narrow subcarrier may require tighter frequency offset (design target of ~5% level); 2) MTC UEs can wake up right before data RX/TX for maximal power saving, and 3) allow good RSRP measurement even under maximal pathloss. In addition, to avoid collision with legacy reference signals, mSYNC can be transmitted in subframes where there are no or limited legacy reference signals. For example, in 3GPP LTE system, mSYNC can be transmitted in MBSFN subframes to avoid the collision with CRS and PSS/SSS.

Figure 4:
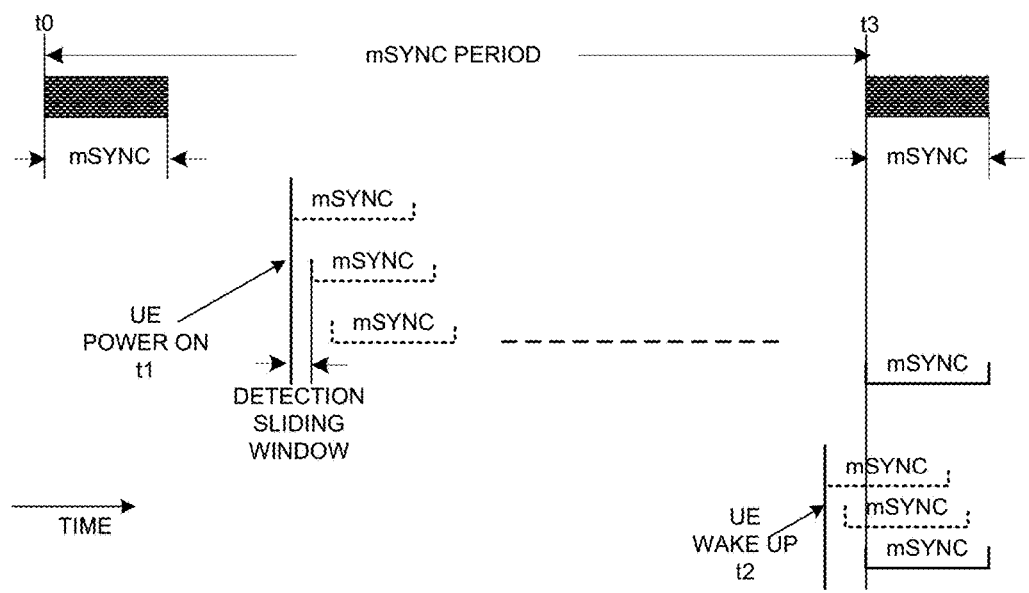
FIG. 4 illustrates examples of using mSYNC for synchronization with a cell.

FIG. 4 illustrates examples of using mSYNC for synchronization with a target cell by an MTC device UE. In accordance with one novel aspect, the mSYNC timing is linked to the SFN of the target cell. Depending on whether the UE knows the timing of mSYNC, i.e., whether the UE knows the SFN of the target cell, there are two different approach for performing synchronization. In a first approach, assume that the UE is first power on at time t1 and has no knowledge of SFN of the target cell. In this scenario, the UE has to blindly detect mSYNC starting from time t1. Suppose a detection-sliding window is used, the UE blindly detects mSYNC by slowly moving the detection-sliding window after each detection attempt. If the UE missed a previous mSYNC transmission at time t0, then the UE needs to make many subsequent detection attempts until the UE finally detects the next mSYNC transmission successfully at time t3.

In a second approach, the UE has performed initial access to the target cell and acquired the cell ID and the SFN of the target cell before the UE goes to sleep. The UE also remembers the cell ID and keep counting the SFN. In this scenario, when the UE wakes up at time t2, the UE already knows the cell ID (assuming no mobility) and the mSYNC timing of the target cell by deriving the mSYNC timing from the SFN. As a result, the UE wakes up at time t2, which is right before the next mSYNC transmission at time t3 with a clock-drift offset. Due to timing offset resulted from clock drift of the UE, the UE needs to wake sufficiently early in order not to miss the beginning of mSYNC. Based on LTE specification, the drift of the time stamping shall not be larger than ±0.72 second per hour, or ±10 seconds over 48 hours. Because the UE wakes up just before the scheduled mSYNC transmission, the UE only needs very few attempts before successfully detecting the mSYNC transmission at time t3. Therefore, by knowing the SFN and the mSYNC timing, the UE is able to quickly re-synchronize with the target cell to improve latency and save power consumption.

Figure 5:
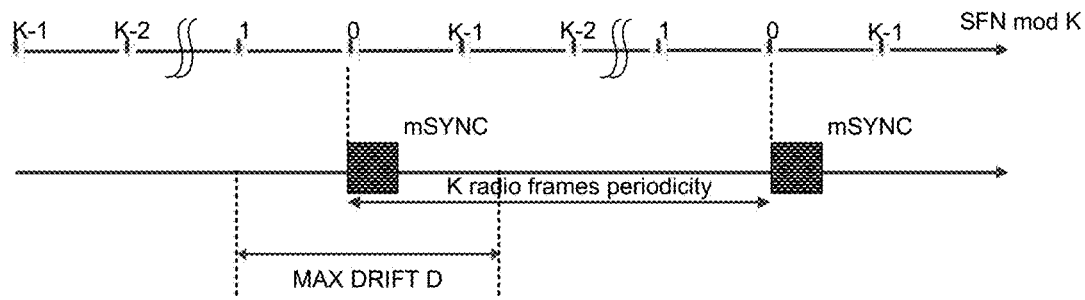
FIG. 5 illustrates one embodiment of mSYNC timing relative to SFN.

FIG. 5 illustrates one embodiment of mSYNC timing relative to SFN. In the embodiment of FIG. 5, the timing of mSYNC from a target cell is implicitly linked to the SFN of the target cell predefined by specification. For example, a specified value of K determines the timing of mSYNC via SFN mod K operation, with SFN and K being multiple of radio frames of 10 ms. The value of K may be indicated by specification. As illustrated in FIG. 5, each mSYNC starts at the radio frame boundary indicated by SFN mod K=0.

As an alternative, the timing of mSYNC from a target cell is explicitly linked to the SFN of the target cell. Similar to FIG. 5, a specified value of K determines the timing of mSYNC via SFN mod K operation, with SFN and K being multiple of radio frames of 10 ms. However, the value of K may be explicitly configured by the network. For example, the value of K may be indicated in a spare field in MIB, or SIB, or even via RRC signaling. Depending on the network deployment scenarios, different periodicity for mSYNC, thus different value of K may be needed. For example, K may be configured to be larger (e.g., K=10, mSYNC periodicity=100 ms) to reduce inter-cell interference, while K may be configured to be smaller (e.g., K=5, mSYNC periodicity=50 ms) to reduce cell discovery latency.

Figure 6:
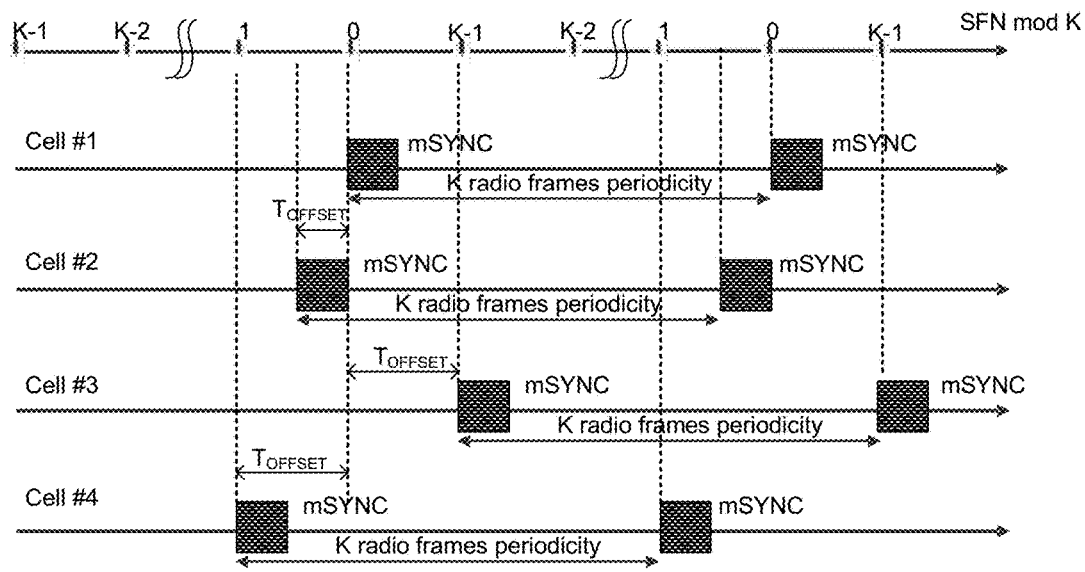
FIG. 6 illustrates another embodiment of mSYNC timing relative to SFN.

FIG. 6 illustrates another embodiment of mSYNC timing relative to SFN. In the embodiment of FIG. 6, the timing of mSYNC from a target cell is implicitly linked to the SFN of the target cell with cell-specific offset predefined by specification. Each mSYNC starts at a cell-specific offset $T_{OFFSET}=L*T$ from the radio frame boundary indicated by SFN mod K=0. The cell-specific offset $T_{OFFSET}$ may be a multiple L of T subframes of 1 ms, or multiple L of T slots of 0.5 ms, or multiple L of some other time values T smaller than a radio frame of 10 ms. The value of L may be derive from the Physical Cell ID (PCI) and a cell specific parameter R to select different value of L for cells with the same PCI. For example, L can be expressed as L=((PCI mod M)+R) mod M, where M and R are integer values predefined by specification.

As illustrated in FIG. 6, four cells CELL #1 to CELL #4 have different mSYNC timing based on the different cell-specific offset $T_{OFFSET}$. For CELL #1, each mSYNC starts at the radio frame boundary indicated by SFN mod K =0 with $T_{OFFSET}$ equals to zero. For CELL #2, each mSYNC starts at the radio frame boundary indicated by SFN mod K =0 with $T_{OFFSET}$ equals to negative five subframes (−5ms). For CELL #3, each mSYNC starts at the radio frame boundary indicated by SFN mod K =0 with $T_{OFFSET}$ equals to one radio frame (10ms). For CELL #4, each mSYNC starts at the radio frame boundary indicated by SFN mod K =0 with $T_{OFFSET}$ negative one radio frame (−10ms). As a result, the mSYNC timing from different neighboring cells are randomized based on cell-specific characteristics (e.g., PCI) of each cell. This way, inter-cell interference among mSYNC transmissions from the neighboring cells can be mitigated. If the neighboring cells are synchronized, then their mSYNC timing is perfectly TDM multiplexed based on their corresponding cell-specific offset. If the neighboring cells are not synchronized, the cell-specific offset may not result in perfectly TDM multiplexed mSYNC transmission. However, the mSYNC transmission timings are naturally randomized to mitigate inter-cell interference.

As an alternative, the timing of mSYNC from a target cell is explicitly linked to the SFN of the target cell with cell-specific offset. Similar to FIG. 6, each mSYNC starts at a cell-specific offset $T_{OFFSET}$=L*T from the radio frame boundary indicated by SFN mod K=0. However, the value of K and the values of M and R used to derive the cell-specific offset value L may be explicitly configured by the network, e.g., indicated in a spare field broadcast in spare bits in MIB/SIB or via RRC signaling. Depending on the network deployment scenarios, different cell-specific offset values may be needed for the transmission of mSYNC. In case of unsynchronized network, judicious choice of M and R could allow near TDM multiplexed mSYNC transmission to reduce inter-cell interference among neighboring cells.

While an MTC device normally has low mobility, it is possible that the MTC device can wake up and find itself in another preferred neighbor cell different from the previous selected or served cell. In one embodiment, the mSYNC timing in neighboring cells is explicitly linked to SFN with cell-specific offset. The values of K, M and R of neighboring cells may be explicitly configured by the network, e.g., indicated via a new SIB (e.g., mSIB) broadcasted by the network. This can facilitate neighbor small cell measurements to prepare for cell reselection or cell handover in case of moving machines. In case of un-synchronized cells, a further offset ΔK relative to the serving cell timing may be indicated to allow the machine to detect mSYNC in neighbor cells.

Figure 7:
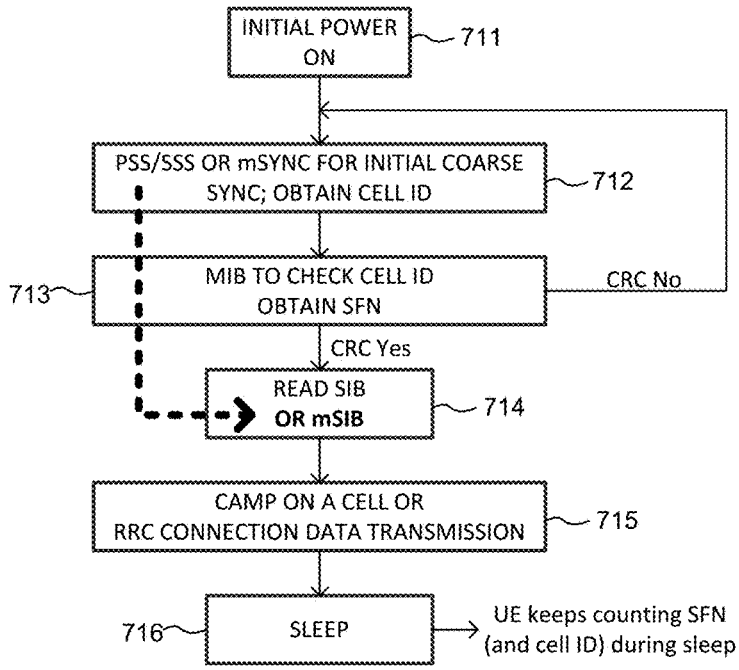
FIG. 7 illustrates a UE behavior of power on or wake up without cell ID and SFN.

FIG. 7 illustrates a UE behavior of power on or wake up without cell ID and SFN. In step 711, a UE (an MTC device) is initially powered on, e.g., when the MTC device is installed. The UE has no information about the network, and uses legacy PSS/SSS or new mSYNC for initial coarse time and frequency synchronization and cell search to obtain cell ID (step 712). In step 713, the UE uses the cell ID and decodes MIB. If MIB is not correctly decoded (CRC no), then the UE goes back to step 712 and repeats searching PSS/SSS until successfully decoding MIB. If MIB is correctly decode (CRC yes), then the UE remembers the cell ID and SFN carried in MIB. The UE then reads SIBs and determines whether to camp on the cell in step 714. For example, if the UE is barred for network access, then the UE may go back to step 712 again. On the other hand, the UE may camp on the cell or may establish RRC connection for data transmission in step 715.

Alternatively, instead of decoding MIB in step 713, the UE may detect for new SIB, e.g., the mSIB for cell ID and SFN (step 714). The UE can check CRC of the mSIB to verify if the cell ID is correct or not. After the UE camps on the cell or establishes RRC connection for data transmission in step 715, the UE will go to sleep, e.g., go to PSM (power saving mode) for power saving in step 716. During sleeping, the UE keeps counting the SFN of the previously camped or served cell. The UE also remembers the cell ID for wake up.

Figure 8:
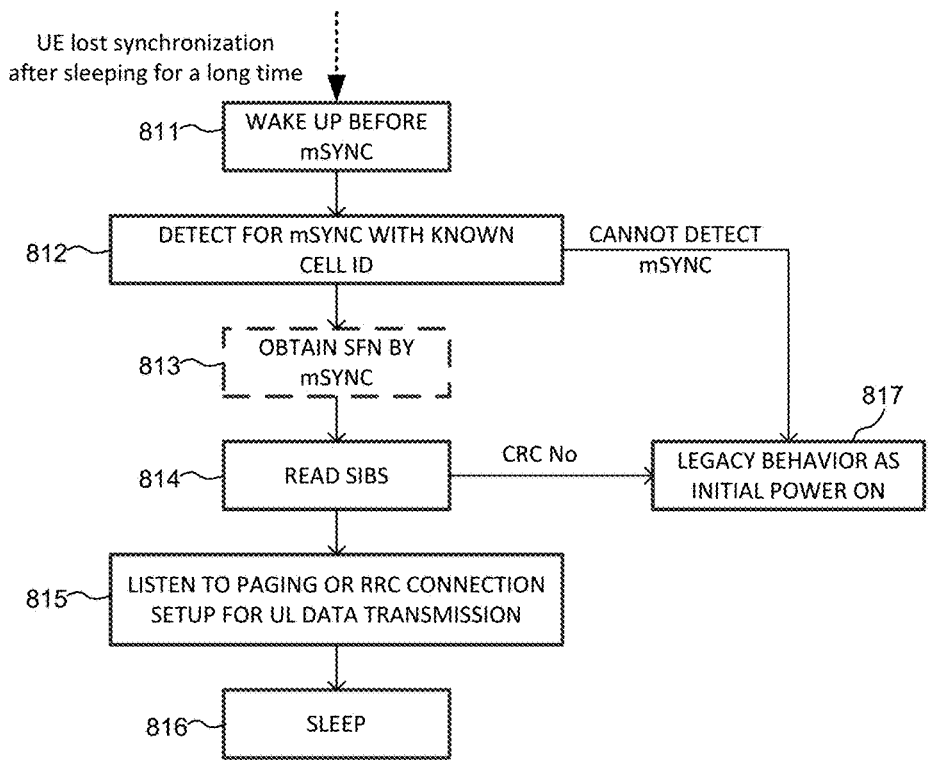
FIG. 8 illustrates a UE behavior of wake up from sleep with known cell ID.

FIG. 8 illustrates a UE behavior of wake up from sleep with known cell ID and SFN. After a long sleep, the UE has lost synchronization with its previously camped or served cell. However, the UE still remembers the cell ID and keeps counting the SFN of the cell. In step 811, the UE wakes up from PSM. Assuming no mobility, UE still knows the cell ID and the SFN with timing drifting. As long as the drift of UE clock does not exceed what is defined by the specification, the UE is able to wake up right before the mSYNC transmission applied with a clock-drift offset. In step 812, the UE detects for mSYNC with known cell ID, because the pilot sequence codes in mSYNC are generated based on the cell ID. If the UE cannot detect mSYNC, then the UE falls back to legacy behavior and performs initial power on in step 817. On the other hand, if the UE detects mSYNC, then the UE can verify the SFN from mSYNC in step 813. In step 814, the UE reads addition information from the SIBs, e.g., mSIB. This mSIB is the same or different with the one read in the initial power on procedure. The location of mSIB may be based on the SFN obtained from the detected mSYNC, or pre-defined relative location based on the detected mSYNC. If the UE cannot pass CRC check for mSIB, then the UE falls back to legacy behavior and performs initial power on in step 817. On the other hand, the UE goes to step 815. The UE may listen to paging from the camped cell. Paging information such as mSYNC cycle may be indicated in mSIB. The UE may check if there is updated information from mSIB. The location of paging may be based on SFN (subframe) or pre-defined relative location based on mSYNC or mSIB. Alternatively, the UE may establish an RRC connection for UL transmission. Finally, in step 816, the UE goes to sleep for power saving and repeats the entire procedure.

From the above illustration, it can be seen that the UE is able to re-synchronize or track synchronization with the target cell using mSYNC if the UE already knows the cell ID and the SFN of the target cell. Typically, the UE first acquires the cell ID and SFN via initial access using PSS/SSS and decoding MIB. In another option, the UE may obtain the cell ID and SFN by detecting the mSYNC itself. First, mSYNC is generated based on the cell ID. Therefore, upon detecting mSYNC, the UE is able to derive the cell ID back from mSYNC. Second, the UE will know the exact SFN and subframe number from the detected mSYNC. Referring back to FIG. 5, if the maximum clock-drift D is less than the mSYNC periodicity of K radio frame, then within the clock-drift offset D, there is only one mSYNC transmission. If the UE detects this mSYNC, which is transmitted in a pre-known SFN and subframe, then the UE will obtain the exact SFN from the detected mSYNC.

Figure 9:
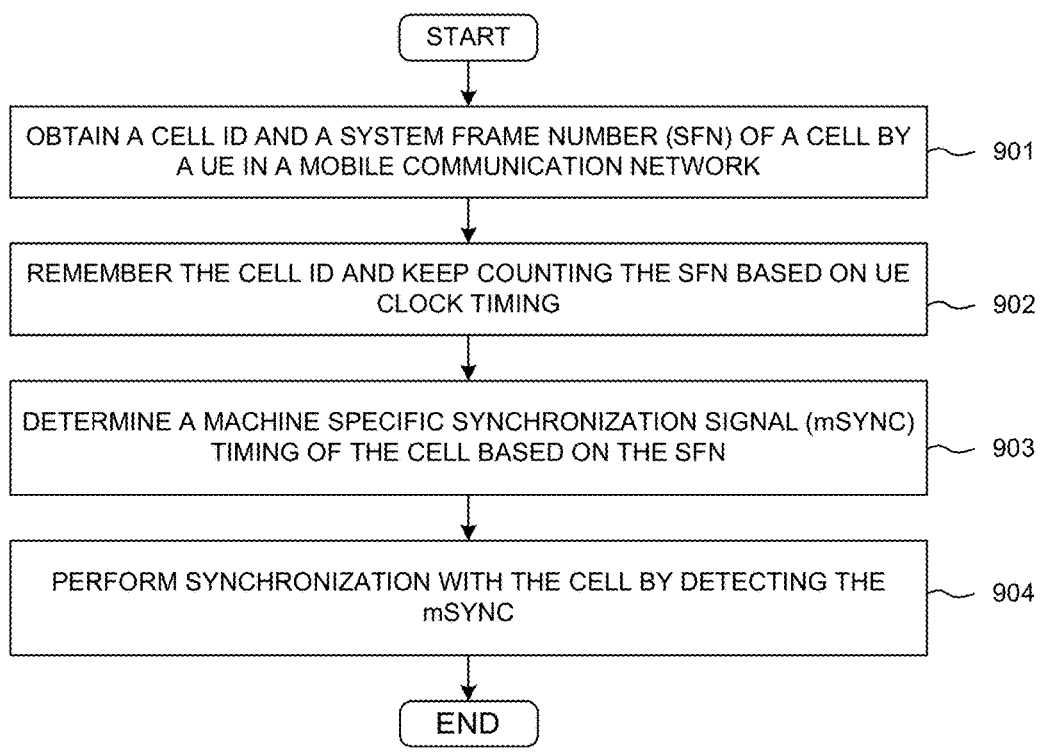
FIG. 9 is a flow chart of a method of performing synchronization using mSYNC within known cell ID and SFN in accordance with one novel aspect.

FIG. 9 is a flow chart of a method of performing synchronization using mSYNC with a known cell ID and SFN in accordance with one novel aspect. In step 901, a UE obtains a cell ID and a system frame number (SFN) used by a cell in a mobile communication network. The UE may obtain the cell ID and SFN by performing initial access using PSS/SSS and reading MIB broadcasted by the cell. The UE may also obtain the cell ID and SFN by (blind) detecting of a machine-specific synchronization signal (mSYNC) transmitted from the cell. In step 902, the UE remembers the cell ID and keeps counting the SFN based on UE clock timing. In step 903, the UE determines the timing of the mSYNC of the cell based on the SFN. In step 904, the UE performs synchronization with the cell by detecting the mSYNC. In one example, the UE enters power saving mode and loses synchronization with the cell after obtaining the cell ID and the SFN of the cell. The UE then wakes up before the mSYNC timing with a clock-drift offset and performs synchronization by detecting the mSYNC.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining a cell ID and a system frame number (SFN) of a cell by a user equipment (UE) in a mobile communication network;
   remembering the cell ID and continuing to count the SFN based on UE clock timing;
   determining a timing of a machine-specific synchronization signal (mSYNC) of the cell by the UE based on the SFN, wherein the mSYNC is a downlink transmission with a periodicity that is substantially longer than one radio frame; and
   performing synchronization with the cell by detecting the mSYNC.

2. The method of claim 1, further comprising:
   entering a power saving mode and losing synchronization with the cell after obtaining the cell ID and the SFN of the cell; and
   waking up before the timing of the mSYNC using a clock-drift offset and thereby detecting the mSYNC.

3. The method of claim 1, wherein the mSYNC comprises a pilot code sequence with high density in time and frequency domain, and wherein the pilot code sequence is generated based on the cell ID.

4. The method of claim 1, wherein the mSYNC is transmitted with a periodicity of 100ms or longer.

5. The method of claim 1, wherein the UE obtains the cell ID by detecting a legacy primary synchronization signal (PSS) / a secondary synchronization signal (SSS) of the cell after initial power on.

6. The method of claim 1, wherein the UE obtains the SFN by reading a master information block (MIB) broadcasted by the cell.

7. The method of claim 1, wherein the UE obtains the SFN by detecting the mSYNC.

8. The method of claim 1, wherein the UE obtains the cell ID by blindly detecting the mSYNC based on a Detection Sliding Window.

9. The method of claim 1, wherein the timing of the mSYNC is based on the SFN.

10. The method of claim 1, wherein the timing of the mSYNC is based on the SFN with a cell-specific offset.

11. The method of claim 1, wherein the mSYNC timing is configured by the network.

12. The method of claim 1, wherein the UE performs synchronization with a neighbor cell, and wherein an mSYNC timing of the neighbor cell is explicitly linked to the SFN with a cell-specific offset.

13. A user equipment (UE) comprising:
   a synchronization module that synchronizes with a cell and obtains a cell ID and a system frame number (SFN) of the cell in a mobile communication network, wherein the UE remembers the cell ID and keeps counting the SFN based on UE clock timing; and
   a configuration module that determines a timing of a machine-specific synchronization signal (mSYNC) of the cell based on the SFN, wherein the mSYNC has a periodicity that is longer than one radio frame, and wherein the UE performs synchronization with the cell by detecting the mSYNC.

14. The UE of claim 13, further comprising:
   an operation module that enters a power saving mode and loses synchronization with the cell after obtaining the cell ID and the SFN, wherein the UE wakes up before the mSYNC timing with a clock-drift offset and thereby detects the mSYNC.

15. The UE of claim 13, wherein the mSYNC comprises a pilot code sequence with high density in time and frequency domain, and wherein the pilot code sequence is generated based on the cell ID.

16. The UE of claim 13, wherein the mSYNC is transmitted with a periodicity of 100ms or longer.

17. The UE of claim 13, wherein the UE obtains the cell ID by detecting a legacy primary synchronization signal (PSS) / a secondary synchronization signal (SSS) of the cell after initial power on.

18. The UE of claim 13, wherein the UE obtains the SFN by reading a master information block (MIB) broadcasted by the cell.

19. The UE of claim 13, wherein the UE obtains the SFN by detecting the mSYNC.

20. The UE of claim 13, wherein the UE obtains the cell ID by blindly detecting the mSYNC based on a Detection Sliding Window.

21. The UE of claim 13, wherein the mSYNC timing is linked to the SFN.

22. The UE of claim 13, wherein the mSYNC timing is linked to the SFN with a cell-specific offset.

23. The UE of claim 13, wherein the mSYNC timing is configured by the network.

24. The UE of claim 13, wherein the UE performs synchronization with a neighbor cell, and wherein an mSYNC timing of the neighbor cell is explicitly linked to the SFN with a cell-specific offset.

25. The method of claim 1, wherein the UE is a machine-type-communication device that is adapted to sleep for more than two minutes.

26. The UE of claim 13, wherein the UE enters power saving mode for more than two minutes and loses synchronization with the cell.

* * * * *